United States Patent
Sezerman et al.

(10) Patent No.: US 10,690,869 B2
(45) Date of Patent: Jun. 23, 2020

(54) GLASS FERRULE COUPLING OF IN-LINE FIBER TAPS AND FIBER CLADDING WAVEGUIDES

(71) Applicant: OZ Optics Ltd., Ottawa (CA)

(72) Inventors: Omur Sezerman, Kanata (CA); Luis Andre Fernandes, Ottawa (CA); Garland Best, Almonte (CA); Mi Li Ng, Ottawa (CA); Farhana Baset, Stittsville (CA)

(73) Assignee: OZ Optics Ltd., Ottawa (CA)

( * ) Notice: Subject to any disclaimer, the term of this patent is extended or adjusted under 35 U.S.C. 154(b) by 0 days.

(21) Appl. No.: 16/374,373

(22) Filed: Apr. 3, 2019

(65) Prior Publication Data

US 2019/0302373 A1 Oct. 3, 2019

(30) Foreign Application Priority Data

Apr. 3, 2018 (CA) ..................................... 3000169

(51) Int. Cl.
| | |
|---|---|
| *G02B 6/28* | (2006.01) |
| *G02B 6/42* | (2006.01) |
| *G02B 6/02* | (2006.01) |
| *G02B 6/293* | (2006.01) |

(52) U.S. Cl.
CPC ....... *G02B 6/4287* (2013.01); *G02B 6/02052* (2013.01); *G02B 6/29385* (2013.01); *G02B 6/2852* (2013.01)

(58) Field of Classification Search
None
See application file for complete search history.

(56) References Cited

U.S. PATENT DOCUMENTS

| 4,191,446 A * | 3/1980 | Arditty | G02B 6/2852 250/227.24 |
|---|---|---|---|
| 4,253,727 A * | 3/1981 | Jeunhomme | G02B 6/4201 385/28 |
| 5,832,156 A * | 11/1998 | Strasser | G01J 3/1895 385/48 |
| 6,865,316 B1 * | 3/2005 | Pratt | G02B 6/4296 385/27 |
| 7,295,731 B2 | 11/2007 | Sezerman et al. | |
| 2017/0015585 A1 | 1/2017 | Sezerman et al. | |

* cited by examiner

*Primary Examiner* — Michael Stahl
(74) *Attorney, Agent, or Firm* — Harness, Dickey & Pierce, P.L.C.

(57) ABSTRACT

A device including an optical tap and waveguide in the core and cladding of an optical fiber together with a glass ferrule that is angle polished to provide a reflection surface (with or without total internal reflection) that produces a reflection of the light tapped from the optical fiber to reach the bottom of the glass ferrule and propagate in a direction that is perpendicular to (or at least different than the direction of propagation close to) the axis of the optical fiber. The fiber waveguide may be created using an ultrafast fabrication method and the glass ferrule can itself be modified by the same ultrafast laser technique to further manipulate the light traveling inside.

15 Claims, 2 Drawing Sheets

GLASS FERRULE COUPLING OF IN-LINE FIBER TAPS AND FIBER CLADDING WAVEGUIDES

CROSS-REFERENCE TO RELATED APPLICATION

This application claims the benefit and priority of Canadian Application No. 3,000,169 filed Apr. 3, 2018, the entire disclosure of which is incorporated herein by reference.

FIELD

The present invention relates to the fabrication of optical waveguides inside optical fibers and the coupling of said light out of the fiber in a manner that provides for the use of said light for sensing, monitoring, and other things.

BACKGROUND

This section provides background information related to the present disclosure which is not necessarily prior art.

Co-owned U.S. Pat. No. 7,295,731 B2 describes a method for using femtosecond laser radiation for the creation of optical waveguiding devices inside standard optical fibers. The femtosecond laser light is focused inside the optical fiber and the intense light generated in the focal region produces non-linear absorption in the glass fiber and creates permanent refractive index changes. The different refractive index regions can be used to produce waveguide vias for light to travel, thus functionalizing the fiber for applications beyond their original intent. For example, these waveguides can be made to interact with the fiber core and allow light to be coupled from the core to the fiber cladding. This technique can be used to form applications such as local light tapping for power monitoring, cladding waveguides for sensing, periodic structures such as Bragg grating for light filters, and others.

In past realizations of this technique, a fiber was attached directly on top of a photodiode and submerged in an index-matching medium in order to facilitate coupling of light originated in the waveguide tap region. The light coupled from the fiber core to the fiber cladding propagated through said cladding towards the edge of the optical fiber and the index-matching medium frustrated the total internal reflection at the fiber edge and provided for the in-situ measurement of said light with a photosensitive device, mainly a photodiode. One drawback of this invention was the necessity to use the index-matching medium to frustrate the total internal reflection at the edge of the fiber. The cylindrical shape of the fiber also adds a layer of difficulty to the process when the fiber is bonded with index-matching glue to a photosensitive surface. Moreover, the shallow exit angles used for the tap coupler makes it difficult to control aspects such as polarization dependent loss or polarization dependant coupling.

Co-owned U.S. Patent No. 2017/0015585 A1 describes a related implementation where the ultrafast laser writing technique is used in combination with a pre-modification process to achieve coupling of light from the core to the cladding of a photonics crystal fiber (PCF). The fabrication method described in this invention suffers the same drawbacks as the ones described for U.S. Pat. No. 7,295,731 B2 and while the method was able to tap light from the core to the cladding of the PCF it was not simple to control the wavelength dependence of that coupling.

SUMMARY

This section provides a general summary of the disclosure, and is not a comprehensive disclosure of its full scope or all of its features.

One potential application for PCFs is supercontinuum generation. Supercontinuum generation is defined as a non-linear process for strong spectral broadening of light.

The present invention sets forth an improvement for allowing the direct measurement of the spectrum instead of just the overall tapped power as per previously known devices and methods.

In one aspect of the invention there is provided an optical fiber, where a waveguide is created in the core and a cladding forms a coupler. The optical fiber is bonded to a glass ferrule with an angled surface arranged such that the light coupled out of the fiber by the waveguide can propagate to the polished surface to be reflected and exit on a side face (potentially perpendicular to the axis of the optical fiber). This configuration can facilitate the monitoring of this tapped light by an external photosensitive detector or it can be used for sensing applications either by manipulating the light inside the ferrule or at its surface.

In another aspect of the invention, there is provided a device comprising an optical fiber having an optical tap; a glass ferrule surrounding the optical fiber and located around the optical tap, the glass ferrule having a face with a surface of high reflectivity and having an outer surface surrounding the optical fiber; wherein light from the optical tap is reflected off the face of the glass ferrule to the outer surface.

In a further aspect of the present invention, there is provided a device wherein the outer surface of the glass ferrule that receives the reflected light is flat.

In a further aspect of the present invention, there is provided a device wherein the outer surface of the glass ferrule is cubic in shape.

In a further aspect of the present invention, there is provided a device wherein the outer surface of the glass ferrule has at least one flat face and the glass ferrule is configured around the optical tap so that the light from the optical tap reflects off the face with the surface of high reflectivity to the flat face.

In a further aspect of the present invention, there is provided a device wherein the face with the surface of high reflectivity is angled relative to the optical fiber.

In a further aspect of the present invention, there is provided a device wherein the face with the surface of high reflectivity is polished or coated.

In a further aspect of the present invention, there is provided a device further comprising a photosensitive device located next to the outer surface of the glass ferrule that receives the reflected light. The outer surface of the glass ferrule that receives the reflected light can be configured to be bonded to the photosensitive device.

In a further aspect of the present invention, there is provided a device further comprising a diffractive optical element located next to the outer surface of the glass ferrule that receives the reflected light.

In a further aspect of the present invention, there is provided a device further comprising a diffractive optical element embedded into the outer surface of the glass ferrule that receives the reflected light.

In a further aspect of the present invention, there is provided a device wherein the face with the surface of high reflectivity is coated with a metal layer. The metal layer can be configured so that the light tapped from the optical fiber is coupled into a plasmonic wave that is sensitive to either external physical conditions or to characteristics of the metal layer.

In a further aspect of the present invention, there is provided a device wherein the face with the surface of high reflectivity is coated with a sensing material that is activated by the light tapped from the optical fiber. The sensing material can be selected from photoluminescent materials, porous polymers, reactive polymers, photo absorbent materials or other similar materials.

In a further aspect of the present invention, there is provided a device wherein the face with the surface of high reflectivity is coated with a photochemical material that changes optical properties depending upon external physical conditions, chemical conditions and/or biological reactions at the face.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
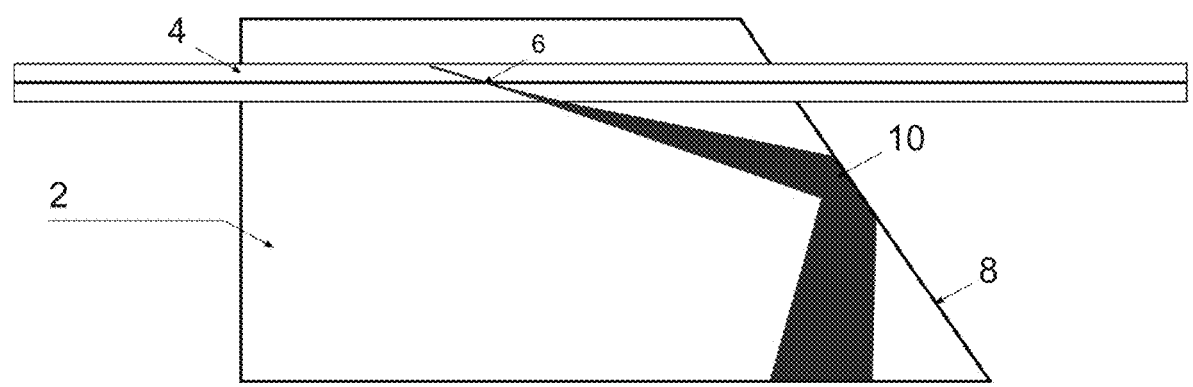
FIG. 1 shows an embodiment of a device seen in two dimensions.
Figure 2:
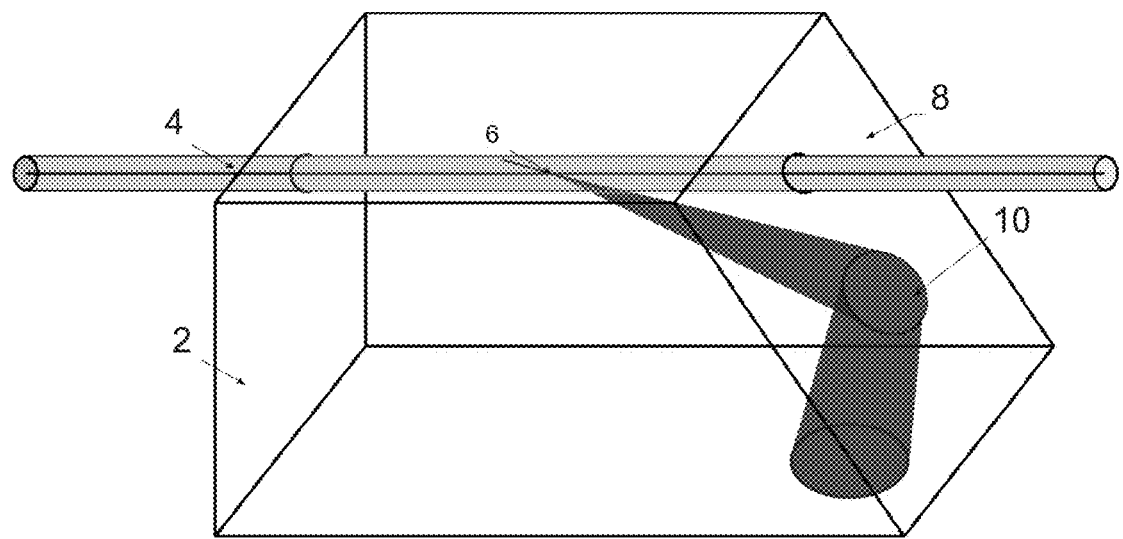
FIG. 2 shows the same embodiment in three dimensions.

In one embodiment, FIGS. 1 and 2 show a glass ferule 2 and optical fiber 4. FIG. 2 presents a three-dimensional view of the glass ferrule 2 and fiber 4, while FIG. 1 presents a two-dimensional view. In both figures, an optical fiber 4 with an ultrafast fabricated optical tap 6 is shown inside the glass ferrule 2. One of the faces 8 of the glass ferrule 2 is polished on an angle that causes the tapped light 10 that exits the fiber 4 to be reflected towards the lower face of the same glass ferrule 2. The face 8 of the glass ferrule 2 can have a coated surface instead of a polished surface or any other form in order to provide a high degree of reflectivity. Furthermore, as another option, the glass ferrule polished surface can be coated with a metal to guarantee reflection at all angles. The metal layer can be designed for light to couple into a plasmonic wave that is sensitive to either external physical conditions or to characteristics of the metal layer, such as thickness.

In other examples, the glass ferrule polished surface can be coated with a sensing material that is activated or probed by the light tapped from the fiber. For example, the coating material can include photoluminescent materials, porous or reactive polymers, photo absorbent materials, or other types of materials. Similarly, the coating material can be a photochemical material that changes its optical properties depending upon external physical conditions and/or chemical or biological reactions at the surface.

The shapes depicted in FIGS. 1 and 2 do not limit the geometry of the glass ferrule 2. While this cubic shape is the preferred embodiment, other embodiments with cylindrical glass ferrules or other shapes can take advantage of the same principles to adapt the devices to other external mechanical constraints.

The configuration shown in FIGS. 1 and 2 is used to collect the light exiting the lower face of the glass ferrule. This arrangement uses the teachings of co-owned U.S. Pat. No. 7,295,731 B2 so that light can be coupled out of the optical fiber 4 after such fiber has been process with a femtosecond laser and waveguides have been inscribed into the fiber cladding.

The optical fiber 4 and glass ferrule 2 can be arranged so that light can exit at a certain angle including, but not limited to, a perpendicular angle from the fiber axis. This can allow coupled light to be collected by any photosensitive element. A photosensitive device will not have to be in direct contact with the fiber or epoxy bonded to the fiber in order for light to reach its photosensitive surface. This provides many advantages for applications such as monitoring of the tapped light 10 by an external photosensitive detector or for sensing applications either by manipulating the light inside the ferrule 2 or at its surface.

On the other hand, if such bonding of the glass ferrule to a photodiode or photosensitive device is desired, the cubic shape of the ferrule 2 will significantly increase the contact surface area between the glass and the photosensitive surface when compared to the cylindrical shape of the optical fiber 4 where the original tap was fabricated. This may have significant impact in the reliability and strength of the bond and improve suitability of the devices that can be used in harsh environmental conditions that are known to stain the epoxy bond line of optical components. Again, such applications can be for monitoring the tapped light 10 by an external photosensitive detector or for sensing applications either by manipulating the light inside the ferrule 2 or at its surface.

In another embodiment, a diffractive optical element can be added to the same configuration show in FIGS. 1 and 2. This element can be either attached to the lower face of the glass ferrule 2 or directly imprinted in the glass ferrule 2 itself by the above-mentioned ultrafast laser writing method or any other method. Such diffractive optical element can include, but is not limited to, a volume diffraction grating for example, which when connected to appropriate photosensitive electronics, can be used as a spectrometer to monitor the spectrum of the light traveling inside the optical fiber. This embodiment can extend the capabilities taught in co-owned U.S. Patent No. 2017/0015585 A1, for example, by monitoring the spectrum in a photonic crystal fiber as opposed to simply monitoring the power of the light traveling inside the PCF. PCFs have been used as supercontinuum source mediums and such an embodiment can be used to directly monitor such supercontinuum spectra in order to provide feedback to the user for the purposes of controlling said spectra.

Figure 3:
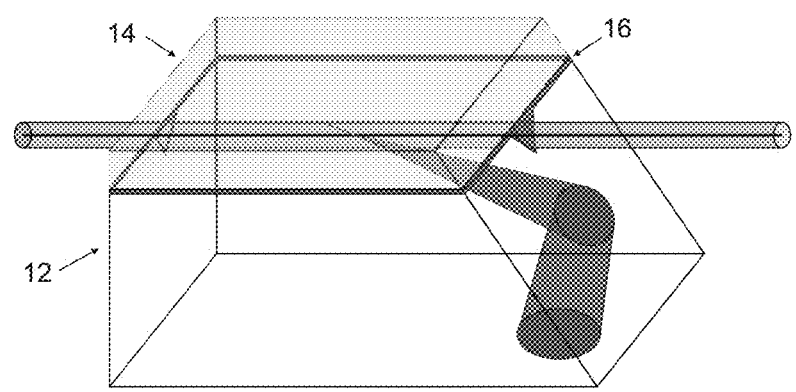
FIG. 3 shows a second embodiment of a device, seen in three dimensions.

In another embodiment, the glass ferrule 2 can be replaced by a V-groove assembly, as shown in FIG. 3. FIG. 3 shows an embodiment where the glass ferrule 2 has been replaced with a V-groove block 12 and lid 14 bonded together using an index matching epoxy 16.

It will be appreciated by one skilled in the art that variants can exist in the above-described arrangements and applications. The scope of the claims should not be limited by the preferred embodiments set forth in the examples, but should be given the broadest interpretation consistent with the description as a whole.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A device comprising:
   an optical fiber having an optical tap;
   a glass ferrule surrounding the optical fiber and located around the optical tap, the glass ferrule having a face with a surface of reflectivity and having an outer surface surrounding the optical fiber;
   wherein light from the optical tap is reflected off the face of the glass ferrule to the outer surface; and
   wherein the outer surface of the glass ferrule that receives the reflected light is flat.

2. The device of claim 1 wherein the outer surface of the glass ferrule is cubic in shape.

3. The device of claim 1 wherein the outer surface of the glass ferrule has at least one flat face and the glass ferrule is configured around the optical tap so that the light from the optical tap reflects off the face with the surface of reflectivity to the flat face.

4. The device of claim 1 wherein the face with the surface of reflectivity is angled relative to a longitudinal axis of the optical fiber.

5. The device of claim 1 wherein the face with the surface of reflectivity is polished.

6. The device of claim 1 wherein the face with the surface of reflectivity is coated.

7. The device of claim 1 further comprising a photosensitive device located next to the outer surface of the glass ferrule that receives the reflected light.

8. The device of claim 7 wherein the outer surface of the glass ferrule that receives the reflected light is configured to be bonded to the photosensitive device.

9. The device of claim 1 further comprising a diffractive optical element located next to the outer surface of the glass ferrule that receives the reflected light.

10. The device of claim 1 further comprising a diffractive optical element embedded into the outer surface of the glass ferrule that receives the reflected light.

11. The device of claim 1 wherein the face with the surface of reflectivity is coated with a metal layer.

12. The device of claim 11 wherein the metal layer is configured so that the light tapped from the optical fiber is coupled into a plasmonic wave that is sensitive to either external physical conditions or to characteristics of the metal layer.

13. The device of claim 1 wherein the face with the surface of reflectivity is coated with a sensing material that is activated by the light tapped from the optical fiber.

14. The device of claim 13 wherein the sensing material is selected from the group consisting of photoluminescent materials, porous polymers, reactive polymers and photo absorbent materials.

15. The device of claim 1 wherein the face with the surface of reflectivity is coated with a photochemical material that changes optical properties depending upon external physical conditions, chemical conditions and/or biological reactions at the face.

* * * * *